J. H. LEHMAN.
MOVING PICTURE SHUTTER.
APPLICATION FILED JUNE 8, 1915.
1,335,744. Patented Apr. 6, 1920.
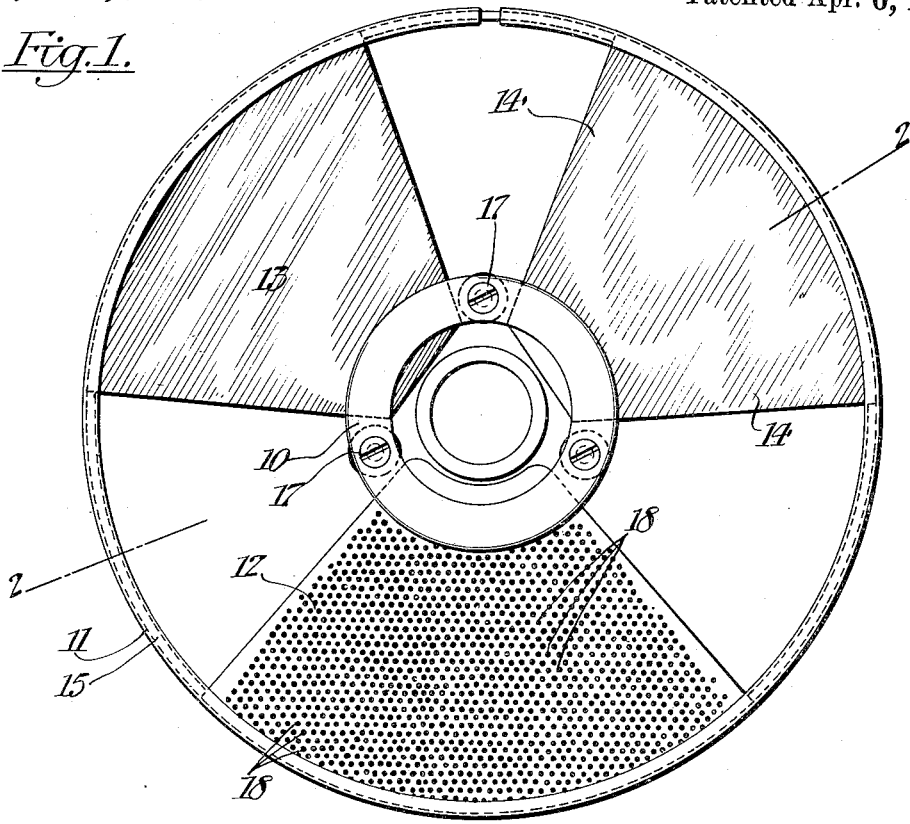
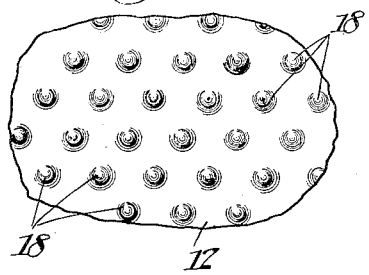
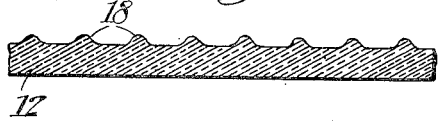
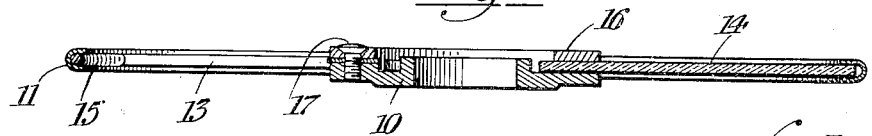
Inventor
Joseph H. Lehman,
by his Attorney

UNITED STATES PATENT OFFICE.

JOSEPH H. LEHMAN, OF NEW YORK, N. Y.

MOVING-PICTURE SHUTTER.

1,335,744.      Specification of Letters Patent.      Patented Apr. 6, 1920.

Application filed June 8, 1915. Serial No. 32,820.

*To all whom it may concern:*

Be it known that I, JOSEPH H. LEHMAN, a citizen of the United States, and resident of New York, in the county and State of New York, have invented certain new and useful Improvements in Moving-Picture Shutters, of which the following is a specification.

My present invention involves certain subject matter divided out of my prior application, Serial No. 33, filed January 2nd, 1915, and certain improvements over the constructions there disclosed. The main object of my present invention is to materially increase the length of time each particular picture is on the screen; increase the amount of light reaching the screen, permit of the use of denser films; materially decrease the amount of current consumed at the source of light; and decrease the "flicker" and eye strain.

In the ordinary shutter, as now employed with moving picture projection machines, all of the light passing through the film is prevented from reaching the screen during the intermittent and successive advancing movements of the film. This leaves the screen dark during these short time intervals and in marked contrast to the high degree of illumination of the screen during the intervening intervals while the picture is being projected. To render this contrast less conspicuous, the shutters are usually so designed or so operated that the screen is also darkened for a very brief interval during the projecting of each picture. Thus, each picture of the film is projected on the screen for only a portion of the time during which it remains stationary and the screen is dark so much of the total time that in order to project the picture with the required distinctness and clearness, it is necessary to employ thin films and illuminating means of very high power. As the illuminating is usually an electric arc, this means a corresponding high current consumption.

In my improved shutter, I form the picture obscuring portion of the shutter preferably of transparent glass with either one or both of its surfaces so formed as to permit the passage of light rays, but at the same time to so refract the light rays that when the obscuring portion is in position, the picture will entirely vanish and without the formation of what is known in the trade as "ghosts." The light rays pass through the film from the illuminating means to the screen at all times. The screen is never darkened by the shutter as is the case when a shutter with an opaque obscuring portion is employed.

The surface of my improved obscuring portion is such that, when it is in position, the light is distributed uniformly over the screen irrespective of variations in the density of the film which is being advanced. In order to prevent the screen from being too highly illuminated during the film advancing and picture obscuring interval, I preferably make the shutter of tinted or darkened glass. The particular kind of glass which I preferably employ and have found by experience operates highly satisfactorily, is known as "optical smoked" glass or "gray" glass of a shade or tint known in the trade as medium or dark. Of course colors other than gray might be employed particularly if a colored film is used, the color of the shutter being sepia, blue, green, or the like, to correspond to that of the film. With very thin or light films or those having a great deal of high light, the shade or tint of the shutter may be correspondingly light, or the tint or shade might be entirely eliminated. For some purposes or with some kinds of films, the shade or tint may be darker.

In order to render still less conspicuous both the non-picture projecting intervals and such variations in the degree of illumination of the film as may occur during the picture projecting and picture obscuring intervals and to prevent fogging, I preferably provide auxiliary blades or shutter portions also formed of glass and also preferably of approximately the same shade or tint of glass as the main section. Such auxiliary portion or portions differ from the obscuring portion in that they permit the passage of light rays without appreciable refraction and permit the projecting of the picture on the screen when such portion or portions are in position. I may employ as many of these portions as may be desired and space them from the obscuring portion and from each other so as to permit the intermittent projecting of the picture with almost the full illumination. All such auxiliary portions may, in some cases, be omitted.

The obscuring portion is only of such width or size that it comes into operation just before the film starts to advance, and moves out of position immediately upon the termination of the film advancing period. Thus, the picture is continuously and uninterruptedly projected on the screen from the termination of one advancing period until the beginning of the next advancing period. The auxiliary portions of the shutter do not interrupt the continuous projecting of the picture, but merely intermittently slightly decrease the degree of illumination of the screen or the number of light rays reaching it. This intermittent but slight darkening of the screen during the projecting of the picture, balances the effect of the obscuring portion.

The picture is continuously projected on the screen for the maximum possible time, that is, from the end of one film advancing period to the beginning of the next; whereas with the ordinary shutter, the effective picture projecting period is very materially shorter, due to the intermittent operation of the so-called "flicker blades" which are ordinarily opaque. By increasing the time the picture is projected, I am able to very materially decrease the amount of light required for its projection and secure a better effect on the screen with less eye strain. The cutting down of the candle-power of the illuminating means, of course, means a material reduction of the current consumption and a corresponding reduction in the cost of picture projecting.

Shutters constructed in accordance with my invention may vary in the form, arrangement and construction of the parts and various different embodiments may be designed within the spirit of my invention without departing from the scope of the appended claims. Therefore, I desire the particular form shown in the accompanying drawing, and the description of the details thereof, to be considered merely as illustrative of my invention and not as any limitation of the scope. In these drawings, to which reference is to be had, and on which similar reference characters indicate corresponding parts in several views, Figure 1 is a face view of a shutter constructed in accordance with my invention;

Fig. 2 is a section on the line 2—2 of Fig. 1, and

Figs. 3 and 4 are plan and section views respectively, on an enlarged scale, of a portion of the obscuring section.

The particular shutter I have illustrated is designed for use in those types of motion picture projection apparatus in which the shutter is rotated through one complete revolution for each complete film advancing and picture projecting period. In such machines the shutter is so mounted as to rotate in a plane at right angles to the direction of projection and in such relationship to the lens, picture opening, and film, that the portion of the shutter between the center and periphery cuts the light rays.

In the specific construction illustrated, the shutter includes a hub portion 10, a rim portion 11, a picture obscuring portion 12, and two flicker blades 13 and 14. The obscuring portion 12 and the flicker blades 13 and 14 are made of glass and are rigidly clamped to the hub in any suitable manner. As shown, I clamp the glass portion to the body of the hub by an annular plate 16 and screws 17. The rim 11 is preferably in the form of a channel, receiving the outer edges of the glass portions and spacers or braces in the form of wire sections 15 between successive glass portions. The sections 15 substantially fill the channel and obviously add materially to the weight of the rim. All three of the glass portions are transparent and are preferably of a tint or shade known as "optical smoked" glass or "gray" glass, the density being as that which is commonly designated medium or dark. The opposite surfaces of the flicker portions 13 and 14 are parallel so that there is no material refraction of the light rays, but the tinting or shading of the glass slightly reduces the illumination of the screen or the number of light rays passing therethrough when such flicker blades are in position.

In stating that the "flicker blades" do not refract the light rays, I do not mean that there is not such refraction as occurs upon a light ray passing through ordinary glass with parallel surfaces. I may get improved results by selecting glass according to its index of refraction, different glass being used for the main blade and the flicker blade depending on whether refraction is to be desired or avoided.

Although I prefer to use glass made of the color, shade or tint desired, yet it is of course evident I may use plain or colorless glass and coat it with a thin layer of transparent material of the desired color or shade value. This coating might be any liquid capable of carrying the desired pigment and evaporating or drying to leave the coating.

The picture obscuring portion 12 may have either one only, or both surfaces provided with such depressions and elevations, or other surface irregularities, that when this portion is in position, the light rays will be so refracted as to effectively and completely destroy the picture on the film and prevent the advancement of the film from being noted by the observers viewing the screen. The surface irregularities are preferably in the form of small lenses 18 of such form that they do not focus the light at any particular points on the screen as might be the case if they were too flat, and they do not refract the rays to such an extent as to cause any material portion of the light rays to strike at any material distance from the screen as might be the case if they were too steep-sided. They merely serve to break up the picture without preventing the passage of light rays to the screen. If the surface irregularities are on one side only, they may have the same light refracting effect as lesser surface irregularities on both surfaces. These surface irregularities may be formed in a great number of different ways as for instance, by molding, etching, cutting, or the like, but I have found that a very simple and effective way of forming them is to cover the entire surface of a sheet of glass of the desired tint or shade, with a layer of lead shot and then pour thereover hydrofluoric acid or other etching composition. The acid will enter between the shot and will act most vigorously at those points where it is least interfered with by the shot. If the acid and shot be removed after a properly limited time, it will be found that at the point where each shot rested on the glass, a mound or projection will be left after the eating away of the glass between the shot. These very small and closely spaced projections constitute lenses of sufficient light refracting power to serve the desired purpose. The composition of the acid or other etching fluid may be such as to leave the surface of the glass, at these projections, and at the sides therebetween, substantially smooth or polished.

Instead of etching away the glass to leave projections constituting the lenses, I might etch, or otherwise form, depressions to serve as the lenses. Instead of etching the glass, I might mold it to produce the surface irregularities desired for my purpose.

Another very satisfactory way of forming the lenses or surface irregularities is by applying to the surface of the glass, a sheet of stencil paper and forming therein a large number of small, closely spaced, perforations. The perforations may be formed in the stencil paper before it is applied to the glass, if desired. A coating of shellac or other suitable material is then applied to the sheet so as to form a large number of closely spaced, small bodies or spots of shellac on the glass. The stencil is then removed and the glass etched so as to leave very slight mounds beneath each shellac spot.

Various modifications and changes may be made in the specific construction illustrated without departing from the spirit of my invention as defined in the appended claims. For instance, in some constructions I may use the ordinary opaque picture obscuring shutter portion and make the flicker blades for the auxiliary shutter portions of colored glass instead of opaque material. This will permit more light to reach the screen than is possible with the ordinary shutter having both the main and the auxiliary portions opaque. Of course, it will not permit of all of the advantages of the construction shown in the drawing. I may also, in some constructions, eliminate the flicker blades and use only the light refracting, transparent, picture obscuring section constructed as hereinbefore described.

Having thus described my invention, what I claim as new and desire to secure by Letters Patent is:

1. A shutter for moving picture projectors, including a picture obscuring portion formed of smoked or gray glass and presenting a series of light refracting lenses upon at least one surface thereof.

2. A shutter for moving picture machines, including a picture obscuring portion formed of tinted glass and a flicker blade also formed of tinted glass, the said obscuring portion having spaced lenses for refracting the light rays and the flicker blade permitting the passage of light rays without refraction.

3. A shutter for moving picture machines having a picture obscuring portion of colored or tinted transparent glass presenting separate well defined light refracting elements, in combination with a flicker blade also of colored or tinted transparent glass, but with its surfaces permitting the transmission of light rays without refraction.

4. A shutter for moving picture machines having a portion formed of smoked glass at least one surface of which presents a series of definite light refracting elements.

5. A shutter for moving picture machines having a portion formed of colored or tinted glass at least one surface of which presents a series of light refracting knobs or projections constituting lenses.

6. A shutter for motion picture machines having a portion opaque to the projection of a picture but transpicuous to the projection of light, and an equalizing portion transpicuous to both light and picture projection, neither of said portions causing any transposition of color.

7. In a shutter for moving picture machines, a carrier, a plurality of sectors radially mounted on said carrier, a rim U-shaped in cross section around the outer edge of said sectors, and a strip held in said rim between said sectors for bracing the same.

8. In a shutter for moving picture machines, a carrier, a plurality of sectors radially mounted on said carrier, a rim U-shaped in cross section around the outer edge of said sectors, and means held in said rim between adjacent sectors for bracing the same.

9. A shutter for motion picture machines having a portion opaque to the projection of a picture but transpicuous to the projection of light, and a flicker blade portion transpicuous to both light and picture projection at reduced brilliancy.

10. A shutter for motion picture machines having a plurality of open spaces, an obscuration blade and a flicker blade, said obscuration blade being opaque to the projection of a picture but transpicuous to the projection of light, and said flicker blade being transpicuous to both light and picture projection, but at reduced brilliancy.

Signed at New York city in the county of New York and State of New York this 7th day of June A. D. 1915.

JOSEPH H. LEHMAN.

Witnesses:
  CLAIR W. FAIRBANKS,
  FLORENCE LEVIEN.